Jan. 27, 1953        D. G. MERRILL        2,626,753
THERMOSTAT
Filed May 27, 1950
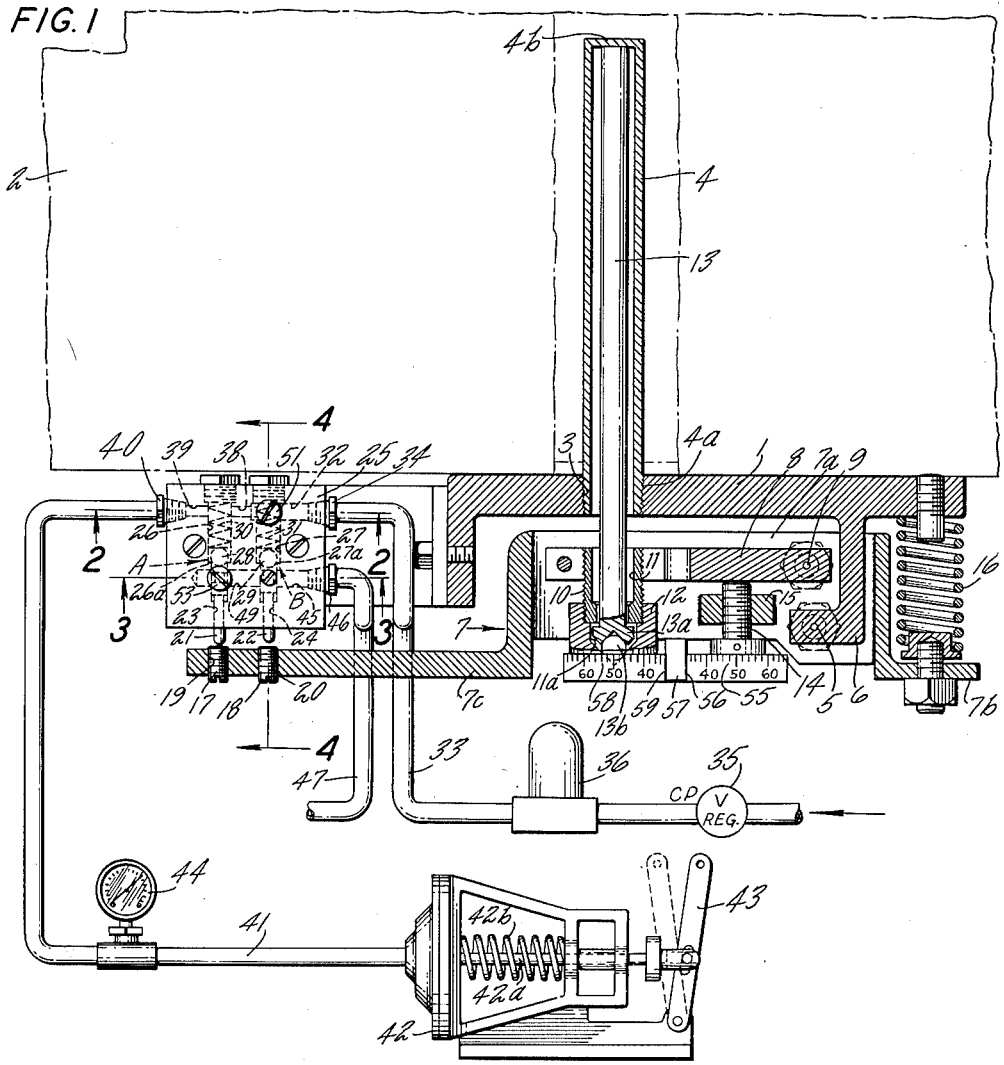
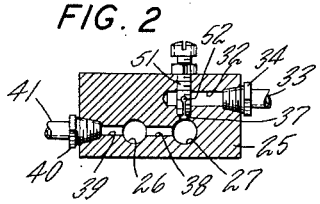
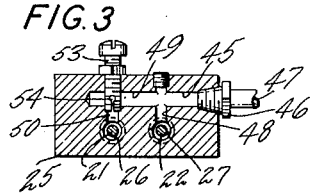
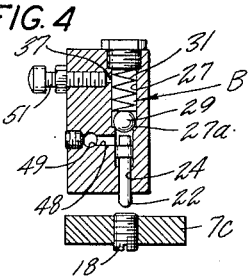
INVENTOR
DONALD G. MERRILL
BY *Parham + Bates*
ATTORNEYS Patented Jan. 27, 1953

2,626,753

UNITED STATES PATENT OFFICE 2,626,753

THERMOSTAT

Donald G. Merrill, West Hartford, Conn., assignor to Emhart Manufacturing Company, a corporation of Delaware Application May 27, 1950, Serial No. 164,758

8 Claims. (Cl. 236—87)

This invention relates generally to improvements in thermostats or temperature controllers and more particularly to a thermostat or controller of a type which comprises a heat responsive element arranged to control opening and closing of a valve to regulate pressure in a fluid pressure line controlling the operation of a fluid motor for adjusting the heating action or effect of a heating means for a lehr or other heated structure.

A thermostat or temperature controller of the type above-mentioned is disclosed in U. S. Patent No. 1,866,366 of July 7, 1932, operatively applied to a lehr. This type of thermostat has advantages of simplicity and sensitivity. A disadvantage is that changes in temperature at the reference point will cause the controlled air pressure to vary between supply pressure and zero quickly so that the thermostat has a tendency to operate on an "off" and "on" basis. The connected fluid pressure motor will operate through its full range as a result of a very small temperature change which may be less than 1° F., for example, and of a pressure change through a rather limited part of the full pressure range. Because of this extreme sensitivity, the control tends to operate on either a "full on" or "a full off" basis and continually over-regulates instead of coming to rest at some balanced regulating position.

It is not desirable to decrease the overall sensitivity of such a thermostat or controller as this could result in a sluggish action whenever increased friction in the motor and valve mechanism occurred. The controlled pressure curve desired, according to the present invention, is one with some spread in the middle range in which the control can "float" and with definite limits beyond which pressure goes to a maximum or to zero promptly. This desired result is obtained as follows. Instead of venting the valve directly to atmosphere, its discharge is restricted by a secondary restricted orifice, provided in the exhaust line, so that control pressure does not fall to zero but levels off at some intermediate pressure depending on the ratio of the areas of the secondary restricted orifice in the exhaust or bleed line and a primary restricted orifice in the pressure supply line, respectively. It will now require a much larger temperature change to give full travel to the connected fluid pressure motor. The floating range can be made longer or shorter as the leveling off pressure is brought up to or lowered away from the fluid pressure motor operating range.

As a safety factor and preferably, a second valve and by-pass connections around the secondary restricted orifice are provided so that pressure may be dropped quickly to zero by opening this second valve. This may be done when the departure from desired temperature reaches a selected value.

When the departure of temperature at the reference point is in the reverse direction and the pressure starting point is "zero," the process of increasing the control pressure to its maximum will be just the reverse of that described for decreasing the pressure from maximum to zero.

Further objects and advantages of the invention hereinafter will be pointed out or will be obvious from the following description of a practical embodiment of the invention, as shown in the accompanying drawings, in which:

Fig. 1 is a view, mainly in plan, with parts shown in section, of the improved thermostat applied to a lehr, which is indicated diagrammatically;

Fig. 2 is a section along the line 2—2 of Fig. 1, showing details of the controlled fluid pressure line;

Fig. 3 is a view like Fig. 2 but along the line 3—3 of Fig. 1; and

Fig. 4 is a similar view but along the line 4—4 of Fig. 1.

The thermostat comprises a supporting plate or bracket 1 which may be mounted in any suitable known manner on a side wall or other fixed part of a lehr 2 or other heated structure in which the temperature is to be controlled. The supporting plate 1 is provided with a threaded opening 3 with which the threaded open end portion 4a of a tube 4 is engaged so that such tube projects from the plate 1 into the lehr 2 or other heated structure. The tube 4 is made of a high expansion heat resisting metal alloy, such as nickel-chrome steel. It is closed at its free end, which is located in the lehr, by an end wall indicated at 4b. Mounted at the outer side of the plate 1, as by being pivotally attached at 5 to outwardly extending integral lug means 6 on the plate, is a lever 7 having a limited range of swinging movements toward and away from such plate. The lever 7 carries a secondary lever 8 which is pivoted thereto at 9 so as to be swingable in a slotted or open-work portion 7a of the main lever 7 about an axis parallel to the axis of pivotal movements of the main lever 7 and toward and away from the outer open end of the tube 4. The secondary lever 8 carries an adjusting screw 10 which is generally aligned with the tube 4 and is formed with an axial bore or cavity 11 open at the end thereof next to the outer end of the tube 4 and extending into the head 12 of such adjusting screw. In the example shown, the head 12 has been formed separately from the shank of the adjusting screw and is screw-threadedly attached thereto.

The internal bore 11 of the screw includes a relatively enlarged portion 11a in the head 12 to accommodate a relatively enlarged outer end portion 13a of a rod 13 which extends from the bore of the adjusting screw 10 into and in the bore of the tube 4 to the end wall 4b of such tube so as to push axially against such end wall. The rod 13 is of a low expansion heat resisting alloy, as for example, chrome steel. It is moved axially relative to the tube 4 as the latter expands and contracts in length in response to temperature changes in the lehr where such tube is located. A ball bearing 13b may be interposed between the enlarged outer end portion 13a of the rod and head of the screw 10 at the outer end of the bore 11. The means for maintaining the rod 13 pushed axially against the end wall 4b of the tube 4 may include a relatively coarse adjusting screw 14 threaded through an apertured integral lug 15 in the slotted portion 7a of the main lever 7 to bear against the outer side of the secondary lever 8 at a point intermediate the pivotal axis 9 and the adjusting screw 10, the latter being near the free end of the secondary lever. The main lever 7 has a relatively short end projection 7b at the opposite side of its pivotal axis 5 from the lever proper. A coil spring 16 is compressed between the lever end portion 7b and the adjacent portion of the supporting plate 1 so as to urge the lever 7 toward the supporting plate 1. The rod 13 thus will be urged continuously toward the closed end of the tube 4. The extent to which the lever 7 will be swung at any given time toward the supporting plate 1 by the action of the spring 16 will be determined by the adjustment of the screws 10 and 14 and the relative lengths of the rod 13 and tube 4. The screws 10 and 14 are adjusted as hereinafter explained to calibrate the device when it is installed and placed in operation.

The lever 7 has a free end portion 7c extending beyond the apertured or open-work portion 7a. Two adjustable valve actuating elements in the form of screws 17 and 18, respectively, are mounted in longitudinally spaced, screw-threaded openings 19 and 20, respectively, in the free end portion 7c of the lever 7. The screws 17 and 18, respectively, are located in line with plungers 21 and 22, respectively, projecting from parallel openings 23 and 24, respectively, in a valve block 25 which is mounted on one end of the supporting plate 1 in opposing relation to the free end of the lever 7. The valve block 25 is is bored to provide parallel valve chambers 26 and 27, respectively, of two pressure control valves which generally are designated A and B, respectively. The valve chambers 26 and 27 are continuous with the openings 23 and 24, respectively, and are formed to provide seats 26a and 27a, respectively, for ball valves 28 and 29. The valve seats 26a and 27a are located intermediate the ends of valve chambers 26 and 27 and face away from the openings 23 and 24. Compression coil springs 30 and 31, respectively, are provided in the valve chambers to press against the ball valves 28 and 29 so as yieldingly to maintain them on their seats.

The plunger actuating screws 17 and 18 may be adjusted to project from the lever 7 to the same extent or to different extents. The arrangement is such in any event that a swinging movement of the free end of the lever 7 toward the valve block 25 will first act through the plunger 21 to move the ball valve 28 of the valve A from its seat while the valve B remains closed. A further movement of the lever 7 toward the valve block will cause unseating of the ball valve 29 to open the valve B. The purpose and effect of this delayed opening of the second valve will be explained.

A passage 32, Fig.2, extends in the valve block from one end thereof to a point adjacent to the valve chamber 27. A pressure fluid supply pipe 33 is operatively connected with the outer end of passage 32 by a suitable pipe fitting 34. The pipe 33 may receive air or other fluid from a source of pressure fluid supply, not shown. A constant pressure outlet regulating valve 35 and air filter 36 may be provided in the pressure fluid supply line between the source and the valve block 25. The passage 32 communicates through a short lateral connecting passage 37 with the valve chamber 27 at a level above the ball valve in the latter. See Fig. 4. A short connecting passage 38 connects the upper portion of the valve chamber 27 with the corresponding portion of the valve chamber 26. From the upper portion of the valve chamber 26, a short passage 39 leads through the remainder of the valve block to the opposite end thereof from that provided with passage 32. Outer end of passage 39 is connected, as by suitable pipe fitting 40, with a pressure fluid delivery pipe 41. The delivery pipe 41 leads to and is operatively connected to a pressure fluid motor 42 which may be a spring type diaphragm motor. The projecting stem 42a of this motor is connected to operate a movable part, shown as a lever 43, which may be considered as representative of the adjusting means of any known heating system, damper system or the like which may be operatively applied to the lehr or other heated structure, the temperature in which is to be controlled in response to variations of temperature at the control point where the temperature responsive element 4, 13 is located. The line 41 may be provided with a suitable pressure gauge 44.

The pressure fluid supplied by the line 41 to the air motor 42 will operate this diaphragm motor 42 in the usual way against a spring 42b of the motor to swing the lever 43 to a position determined by the pressure of the pressure fluid. As this pressure is increased from zero it reaches some value sufficient to overcome the pressure of the extended spring causing the lever to move away from its extreme inward position. A further increase in pressure will cause a further compensating compression of the spring so that the lever takes a new position. At a sufficiently high pressure which is preferably considerably below the supply pressure, the lever takes up the extreme outward position. Within this range of pressures in which the lever moves from one extreme to the other there is for each value of the control pressure a corresponding deflection of the spring 42b and a corresponding position of the lever 43. The means for and manner of regulating the control pressure will now be described.

An exhaust line in the valve block 25 includes a passage 45, Fig. 3, opening through one end of the valve block and there connected by a suitable pipe fitting 46 with an external venting or exhaust pipe 47. The passage 45 is connected by a short lateral passage 48 with a lower portion of the valve chamber 27 at a level below the valve seat 27a as best seen in Fig. 4. The passage 45 has an extension, indicated at 49, Fig. 3, in the valve block 25, connected by a short lateral passage 50 with the lower portion of the valve chamber 26.

A restriction is placed in the pressure fluid supply line in the block 25 between the pressure fluid supply passage 32 and the valve chamber 27. This restriction is provided in the example shown by inserting a screw 51 across the passage 32 into the passage 37, Fig. 2, so that communication between the passages 32 and 37 is through a restricted orifice 52, called the primary orifice, provided in the screw 51. The screw 51 may be removed for cleaning.

A restriction also is placed in the exhaust line in the block 25 between the lower portion of the valve chamber 26 and the passage 49. This also is provided by inserting a screw 53 across the passage 49 into the connecting passage 50, the screw 53 having a restricted orifice 54, called the secondary orifice. See Fig. 3.

In operation, fluid pressure from the supply line 33 communicates through primary orifice 52, upper portions of valve chambers 27 and 26 in turn and thence through passage 39 with delivery pipe 41. If valves A and B remain closed, there will be no flow past orifice 52 and full supply pressure will be maintained on pipe 41 and air motor 42. As valve A is lifted slightly, there will be some flow past ball 28 and through orifice 54 and the pressure in passage 39 will assume a value depending on the relative areas of primary orifice 52 and secondary orifice 54 and the amount of opening of valve A. As valve A opens further, the pressure in passage 39 will fall to a value determined only by the sizes of orifices 52 and 54 which value may be chosen at or near the pressure which corresponds to extreme inward position of air motor lever. By this means, the motion of valve A, which is necessarily very small, is made to correspond to the restricted pressure range of actual air motor operation instead of to the full range from zero to supply pressure. The change in control pressure is therefore much smaller for each degree of temperature change and any tendency to overshoot is therefore overcome. By suitable choice of orifice sizes, the control pressure and the movements of lever 43 can be made to correspond closely to the temperature departures and heat supply changes will be made in correct amount to restore temperature equilibrium. The control devices will therefore "float" within the control range, making compensating motions proportional to the departure of temperature from the "set" value instead of continually swinging from one extreme position to the other.

Since the accuracy of the described adjustments are adversely affected by friction in the moving parts and by dirt particles in the fluid passages, it is desirable to insure travel to either extreme position when temperature departure reaches certain values. Travel to extreme outward position is insured by maintaining supply pressure well above that normally required to fully compress the spring 42b. Travel to extreme inward position is insured as follows. Adjustment of screw 18 is such that valve B begins to lift when the desired upper limit of temperature is reached. This places delivery pipe 41 in direct communication with vent pipe 47 by means of passages 39, 27, 27a, 48 and 45. The control pressure then drops to zero which is considerably less than the pressure required to balance the spring. This leaves a large excess of compression in the spring to insure travel to the extreme inward position.

The device may be set to maintain a desirable temperature at the place in the lehr or other structure at which the temperature is to be controlled by first adjusting the coarse adjusting screw 14 to an appropriate extent as indicated by the judgment of the operator in the light of his knowledge of the conditions involved and then making further and finer adjustments if required by adjustments of the adjusting screw 10 alone or of both adjusting screws until the temperature at the controlled place coincides with that desired, this information being obtained by reading a suitably placed pyrometer or in any other suitable known manner. The head of the coarse adjusting screw 14 is provided with a peripheral scale 55, the graduations of which have values related to those of a pyrometer or other temperature measuring instrument. An index element 56 may be provided on a fixed projection 57 on the lever 7 in cooperative relation to the scale 55. A similar peripheral scale 58, cooperative with an index element 59 on the projection 57, may be provided on the head of the fine adjusting screw 10. To calibrate the device after it has been set to maintain a desirable temperature in the manner described, the coarse adjusting screw 14 and the fine adjusting screw 10 which of course have reverse positioning actions on the lever system may be given mutually compensating turning movements about their respective axes until the scale 55 on the head of the coarse screw 14 and its cooperative index element 56 show the temperature which the device is set automatically to maintain. Changes of setting by known amounts to maintain temperatures differing from that of the previous setting can now be made by adjusting the coarse adjusting screw 14 as indicated by the scale 55 thereon. Fine adjustments by the fine screw 10 and reference to the scale 58 thereon may be made from time to time to correct any discrepancy between the reading of the scale 55 and the corresponding pyrometer reading or in the event that calibration has been destroyed for any cause, as by "creep" in the expansion elements which will occur over a period of time, readjustment of the control valves to suit operation requirements, disassembly of the parts of the valve block for cleaning or other purpose, etc. By providing the fine and coarse adjusting screws and providing scales suitable to indicate temperature values, the calibration may be readily effected upon installation and again thereafter if needed.

Many changes in and modifications of the illustrative embodiment of the invention shown in the accompanying drawings and herein particularly described will now be obvious to those skilled in the art and I therefore do not wish to be limited to the details of this embodiment.

I claim:

1. A thermostat comprising a fluid pressure supply line for conducting fluid pressure from a source of supply to a fluid pressure motor, a fixed restriction in the supply line defining a primary restricted orifice therein, a fluid pressure exhaust line operatively connected to the supply line between the primary orifice and said motor, a fixed restriction defining a secondary restricted orifice in said exhaust line, a valve in said exhaust line adapted when closed to shut off exhaust of fluid pressure from the supply line through the exhaust line and to permit such exhaust when opened, a thermo-responsive element, means responsive to said thermo-responsive element to control the opening and closing of said valve, and a second exhaust valve and connections with the supply line and exhaust line by-passing said first valve and said secondary restricted orifice.

2. A thermostat as defined in claim 1 wherein said valves are arranged to be opened in a predetermined sequence by said means responsive to said thermo-responsive element.

3. A thermostat as defined by claim 2 wherein said first mentioned valve is opened before and closed after said second valve.

4. A thermostat comprising a fluid pressure supply line to conduct fluid pressure from a source of supply to a fluid pressure motor, a fluid pressure exhaust line having a portion adjacent to a portion of the supply line, two exhaust valves having separate valve chambers each connected at one end with the supply line and at the opposite end with an adjacent portion of the exhaust line, each valve having an intermediately located seat and a cooperative movable valve member in its chamber, the valve member being adapted when seated to cut off flow of fluid pressure through the valve chamber from the supply line to the exhaust line and to permit such flow when unseated, each of said valves having an opening at the end of its chamber remote from the supply line, spring means yieldingly holding each valve member on its seat, a valve member unseating plunger movable in the portion of each chamber remote from the supply line and protruding therefrom, a restriction in the exhaust line between its connections with the chambers of said two valves, a pivoted lever to actuate said plungers to unseat said valve members in sequence against the pressure of their springs, and a thermo-responsive element arranged to actuate said lever to effect unseating of said valve members on a predetermined change of temperature affecting the thermo-responsive element.

5. A thermostat comprising a supporting plate, a valve block carried by said supporting plate at one end thereof, a pressure fluid supply line having a portion extending through said valve block and adapted to conduct fluid pressure from a source of supply to a fluid pressure motor, an exhaust line having a portion extending into said valve block in spaced adjacent relation to a portion of the supply line, two exhaust valves in said valve block separately connecting the portions of the supply line and exhaust line in said block, said valves being normally closed to prevent flow of fluid pressure from the supply line to the exhaust line and having movable valve opening plungers projecting from the valve block, a restriction in the exhaust line between said two exhaust valves, a lever pivoted to said supporting plate to swing in a path extending across the projecting ends of said valve opening plungers, a thermo-responsive element carried by said supporting plate, and adjustable means operatively connecting said thermo-responsive element with said lever to operate the latter to actuate said plungers to open said valves sequentially on a predetermined change of temperature affecting the thermo-responsive element.

6. A thermostat as defined by claim 5 wherein said lever includes separate individually adjustable contact elements in line with the projecting ends of the plungers to time the actuation of said plungers by a swinging movement of said lever.

7. A thermostat as defined by claim 5 wherein said thermo-responsive element comprises a tube of heat resisting high expansion material carried by said supporting plate to project from the side thereof opposite said lever, said tube being closed at its end remote from said plate and a rod of heat resisting low expansion material extending in the tube against the closed end thereof and projecting from the supported end of the tube at the same side of the supporting plate as said lever, a secondary lever mounted on the first lever, a hollow adjusting screw carried by said second lever to bear against the adjacent end of said rod, a second adjusting screw carried by said first lever to bear against the second lever in opposition to said first adjusting screw, and spring means acting on the first lever to tend to swing it against the plungers projecting from said valve block.

8. A thermostat comprising a supporting plate having a threaded opening in a portion thereof, a tube of heat resisting high expansion material mounted at one end in said opening of said supporting plate to project from one face of the supporting plate, said tube being closed at its projecting end, a rod of heat resisting low expansion material extending in said tube to the closed end thereof and projecting from the opposite face of the supporting plate, a main lever pivoted on said supporting plate to swing toward and away from the face thereof opposite said projecting tube and adjacent to the projecting end of said rod, a secondary lever pivoted on said main lever, a hollow fine adjusting screw carried by said secondary lever so as to fit over the projecting end of said rod, a compression spring arranged between the main lever and supporting plate so as to urge said lever to swing toward said plate, a coarse adjusting screw carried by the main lever to bear against the secondary lever in opposition to said fine adjusting screw and cooperative with said compression spring acting on the main lever to maintain said fine adjusting screw pressed firmly against the projecting end of said rod, temperature regulating means operable by said main lever on swinging movements thereof in response to expansion and contraction of said tube in relation to said rod, and peripheral scales on the heads of said adjusting screws and cooperative index elements on said main lever for use in calibrating the thermostat.

DONALD G. MERRILL.

REFERENCES CITED

The following references are of record in the file of this patent:

UNITED STATES PATENTS

| Number | Name | Date |
|---|---|---|
| 1,805,971 | Bristol | May 19, 1931 |
| 2,029,203 | Soderberg | Jan. 28, 1936 |